Dec. 30, 1930.   W. NOBLE   1,787,119

PISTON

Filed June 17, 1927

Inventor
Warren Noble.

By
Attorney

Patented Dec. 30, 1930

1,787,119

UNITED STATES PATENT OFFICE

WARREN NOBLE, OF DETROIT, MICHIGAN

PISTON

Application filed June 17, 1927. Serial No. 199,472.

This invention relates to pistons, more particularly for internal combustion engines, and has for its object to provide a simple construction which may be easily and cheaply manufactured and which provides for freedom for expansion in the head of the piston without setting up conditions affecting the efficiency of the operation of the piston and wherein the effects of such expansion are not communicated to the skirt.

More particularly the invention has for its object to provide a piston with a separable head and skirt so devised and connected together that great freedom from transmission of heat from the head to the skirt is obtained, and wherein expansion of the head when subjected to high temperatures does not result in the setting up of objectionable strains in or warping of the skirt, neither does it produce any tendency to bend or warp the wrist pin of the piston.

The invention still further contemplates the provision of a piston having a separable head and skirt wherein the skirt is mounted on wrist pin bosses of the head through the medium of a wrist pin in such manner that the said bosses float on the said wrist pin in a manner permitting the bosses to adjust themselves along the axis of the wrist pin upon the expansion of the head, whereby the wrist pin bosses are subjected to only compression and tension in use, and whereby the skirt anchorage is only charged with its own weight and is free from stresses resulting from piston expansion.

A further and important object of the said invention is to provide a floating condition in the head of the piston relative to the skirt whereby it may adapt itself to conditions resulting from changes of temperature without restraint by the skirt of the piston.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a piston wherein a shallow head, carrying the usual compression rings, is provided with depending wrist pin bosses set inwardly to the periphery of the head, said bosses having a wrist pin extending freely therethrough, the ends of which project therebeyond, and a separate skirt mounted on the projecting ends of the said wrist pin, the upper edge of the shirt juxtaposed to but not connected to the lower surface of the head of the piston, the said bosses being disposed within the said skirt but spaced therefrom in a manner permitting their movement along the axis of the wrist pin.

All of which is more particularly described and ascertained hereinafter, by way of example, having reference to the accompanying drawing, wherein:—

Figure 1:
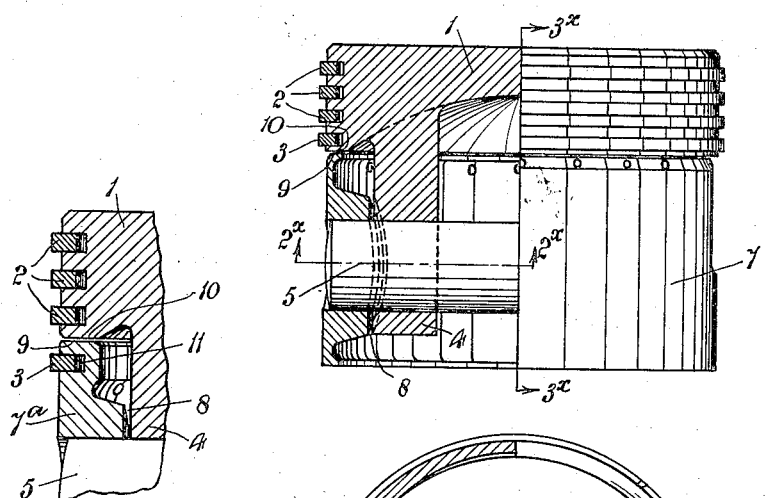
Figure 1 is a sectional elevation of a piston embodying the said invention, the section being taken on the line $1^x \ldots 1^x$ of Figure 2.

1 is a piston head of shallow formation carrying the compression rings 2 and oil ring 3, the piston head having wrist pin bosses 4 depending therefrom inwardly of the periphery of the head. 5 is a wrist pin extending through the said bosses and loosely fitted therein to the extent that the said bosses are capable of movement therealong while the wrist pin is capable of movement therewithin, the ends of the said wrist pin projecting beyond the outer faces 6 of the said bosses; and on the projecting ends of the said wrist pins is mounted a skirt 7, the said skirt being spaced from the bosses 4 as indicated by the reference numeral 8. This skirt is also preferably slidably fitted on the wrist pin so that the said wrist pin does not need to be pinned or otherwise secured against movement in the skirt or in the bosses.

The upper end 9 of the said skirt is juxtaposed to the lower face 10 of the head of the piston although it is not tightly held thereagainst, and may be appreciably spaced therefrom, so as to admit passage of oil between the said faces when the piston is in operation. The oil film so provided retards flow of heat directly from the head to the skirt through the upper part thereof, which, in addition to the fact that there is no metallic connection between the upper part of the skirt and the head of the piston and the fact that there are no direct metallic connections between the bosses and the skirt, ensures a cool skirt which is little affected by the heat in the head of the piston.

It is apparent that the head of the piston floats on the wrist pin relative to the skirt and may, therefore, adapt itself to dimensional changes resulting from changes in temperature of the head; and it will be further apparent that the lengthening of the stems or posts of the wrist pin bosses due to heat will not impose any stresses on the skirt but simply result in a slight increase in spacing of the skirt from the head, and that any diametrical expansion of the head will simply result in sliding movement of the wrist pin bosses on the wrist pin without restriction by the skirt and without setting up stresses in the skirt or in the wrist pin.

Figures 2, 4:
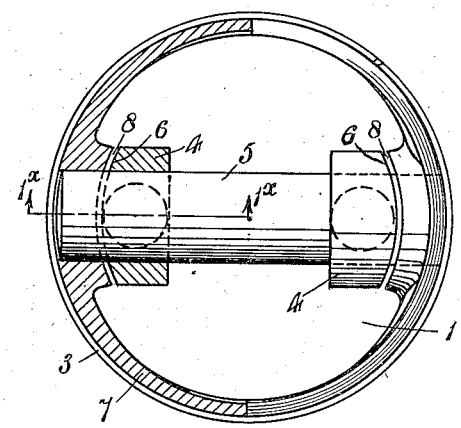
Figure 2 is a plan of underside of the same, partly in section taken on the line $2^x \ldots 2^x$ of Figure 1.
Figure 4 is a fragmentary sectional detail view indicating a modified arrangement of the oil ring of the piston.
Figure 3:
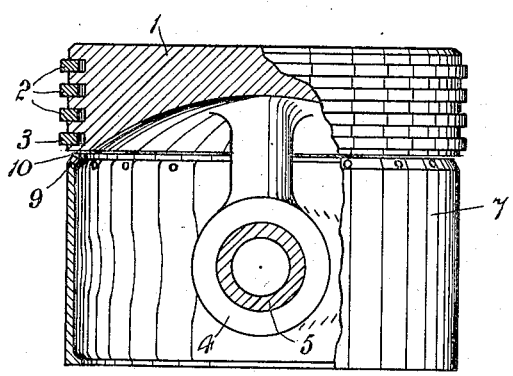
Figure 3 is a sectional elevation of the same, the section being taken on the line $3^x \ldots 3^x$ of Figure 1.

The present invention is not limited to the particular placement or disposition of the rings, as it will be seen from Figure 4 that the oil ring 3, in this example, is carried in a groove 11 in the upper part of the skirt 7ᵃ.

This invention may be developed within the scope of the following claims without departing from the essential features of the said invention, and it is desired that the specification and drawing be read as being merely illustrative and not in a limiting sense, except as necessitated by the prior art.

What I claim is:—

1. In a piston, a head and a skirt in spaced relation, fluid heat insulating means between the lower edge of said head and the upper edge of said piston and oil passages in said skirt below said insulating means, the lower edge of said head acting as an abutment for the upper edge of said skirt whereby rocking is definitely restricted.

2. In a two part piston, a head and a skirt in slightly spaced relation, means associated with said head for definitely restricting the tilting of said skirt with respect thereto and means for diverting a portion of the lubricating oil flowing towards the space between said skirt and said head.

3. In a piston, a head and a skirt secured in freely floating relation on a wrist pin, and slightly spaced therefrom, the lower edge of said head acting as an abutment against rocking of said skirt and oil passages in said skirt to intercept oil flowing upwardly toward said head.

4. In a piston, a head having bosses depending therefrom, a skirt circumscribing said bosses, a wrist pin freely floating in said bosses and securing said skirt and said head in pivotal spaced relation, the bottom edge of said head and the top face of said skirt being sufficiently spaced to allow oil therebetween, and sufficiently close to form an abutment for each other against rocking and auxiliary means for returning oil on said skirt to the interior of said skirt.

5. In a two part piston, a head and a skirt, secured in slightly spaced relation, a bevelled face on the upper end of said skirt, oil passages thru said bevelled edge leading to the interior of said skirt whereby a portion of the lubricant flowing upwardly on said head may pass therethru, the remainder of said oil passing to the space between said head and said skirt.

6. In a piston, a head having bosses depending therefrom, a skirt circumscribing said bosses, a wrist pin freely mounted in said bosses and in said skirt, and securing said head and said skirt in spaced relation, a bevelled face on the upper end of said skirt for abutment against the lower edge of said head and oil passages in said bevelled edge leading to the interior of said skirt.

7. In a piston, a head having bosses depending therefrom, a skirt circumscribing said bosses, a wrist pin floating in said bosses and securing said skirt and said head in slightly spaced pivotal relation, oil between the lower edge of said head and the upper edge of said skirt forming heat insulating means and oil passages below said insulating means leading to the interior of said skirt.

8. In a piston, a head having bosses depending therefrom, a skirt circumscribing said bosses, a wrist pin floating in said bosses and securing said skirt and said head in slightly spaced pivotal relation, the space between the bottom of said head and the top face of said skirt being completely filled with oil whereby said skirt is heat insulated from said head and oil passages in said skirt leading to the interior of said piston.

9. In a piston, a head having bosses depending therefrom, a skirt circumscribing said bosses, a wrist pin floating in said bosses and securing said skirt and said head in slightly spaced pivotal relation, the upper face of said skirt being bevelled for abutment against the lower edge of said head whereby rocking is limited, and oil passages leading to the interior of said piston.

10. In a piston, a head having bosses depending therefrom, a skirt circumscribing said bosses, a wrist pin floating in said bosses and securing said skirt and said head in slightly spaced pivotal relation, the upper face of said skirt being bevelled and having oil passages therein to the interior of said skirt.

In testimony whereof I affix my signature.

WARREN NOBLE.